INVENTORS
Konrad J. Hofmeister and
Robert A. Sylvester.
ATTORNEY

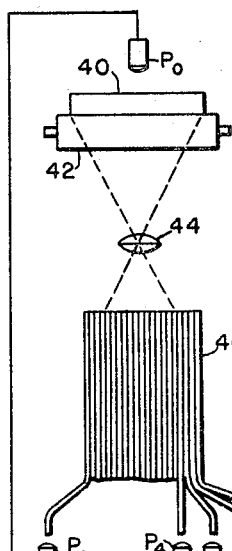
Fig. 2A.
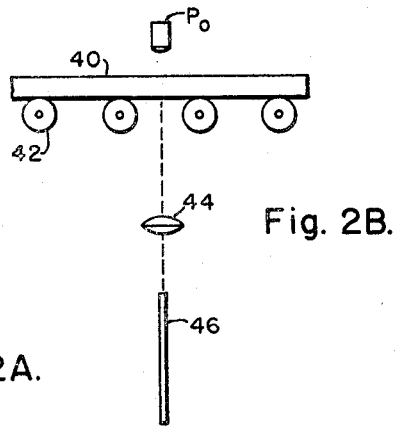
Fig. 2B.
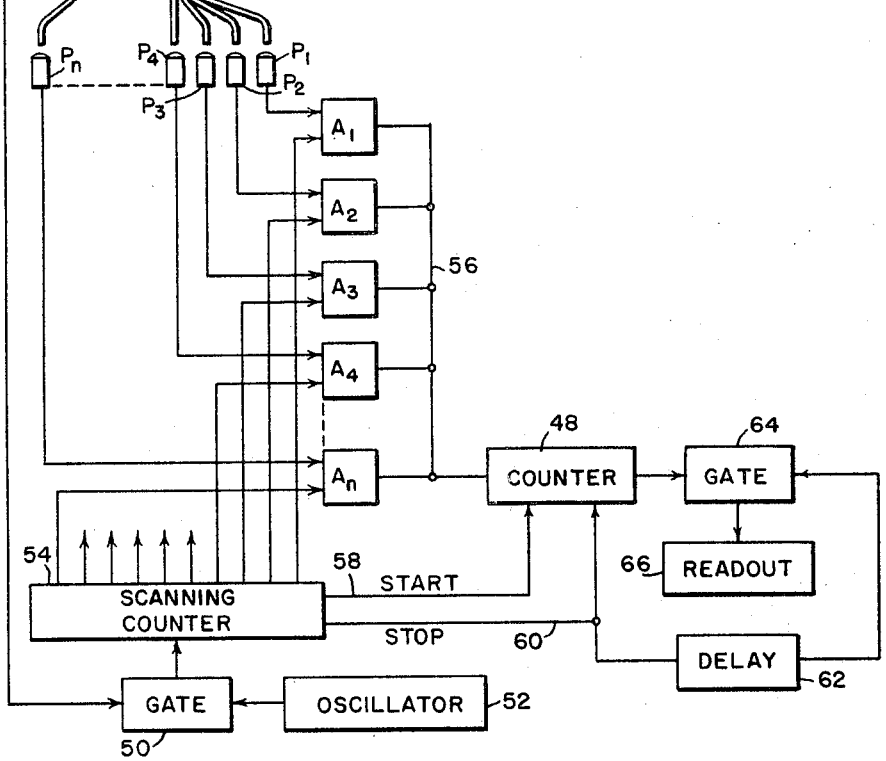

United States Patent Office 3,428,817
Patented Feb. 18, 1969

3,428,817
LENGTH MEASURER WITH PLURALITY OF PHOTOCELLS WHICH ARE SEQUENTIALLY GATED
Konrad J. Hofmeister, Pittsburgh, and Robert A. Sylvester, Coraopolis, Pa., assignors to Jones & Laughlin Steel Corporation, Pittsburgh, Pa., a corporation of Pennsylvania
Filed Nov. 27, 1964, Ser. No. 414,071
U.S. Cl. 250—219  15 Claims
Int. Cl. G01n 21/30

ABSTRACT OF THE DISCLOSURE

Described is a system for continually measuring a dimension of an object by means of a plurality of article sensing devices, such as photocells, spaced along the dimension being measured with at least a portion of the article sensing devices extending beyond an edge of the article when the dimension is being measured. This is accomplished by connecting the outputs of sensing devices to a counter through gates which are sequentially enabled repeatedly, the counter being reset each time the gates are enabled in sequence.

---

This invention relates to gages adapted to measure a dimension of an object without contacting the same, and more particularly to a dimensional gage of the type described adapted to continually determine the instantaneous value of a varying dimension.

While not limited thereto, the present invention is particularly adapted for use in measuring a dimension of a moving or stationary article such as a hot steel slab where the measuring apparatus cannot come into contact with the article itself because of its high temperature or other considerations. As is known, non-contacting dimensional gages, as such, have been used in the past. For example, systems such as those described in U.S. Patents Nos. 1,998,950 and 3,066,266 have been proposed for measuring the total length of a moving object by the use of photocells spaced along the length of a conveyor on which the object moves. While such systems are entirely satisfactory for their intended purpose, they are generally limited to measuring the dimension of the object between its leading and trailing edges along a path of travel and also require that the object be moving during the measuring operation.

In many cases, it is necessary or desirable to measure a dimension of a moving object which, because of the movement of the object, may continually or intermittently vary. For example, when it is desired to shear a hot steel slab into a desired length, the end of the slab must be advanced beneath a shear on conveyor rolls or the like to a point where the desired length projects beyond the shear. In this process, the operator controlling movement of the slab may have to advance it in one direction and then reverse the direction of movement in order to position the slab at a point where the correct length will be sheared off. In such an arrangement, it is highly desirable to provide an instantaneous indication of the length of the slab beyond the shear regardless of its position so that the operator, in viewing the indication, can determine whether the slab must be advanced or retracted for the correct shear length.

Likewise, in certain cases it is necessary or desirable to continually monitor the width, for example, of an object moving along a conveyor, which width may vary along the length of the object. While this latter objective can be achieved with the use of an electron-optics device such as a vidicon employing single-line scanning, the circuitry required for such an installation, and the cost of the components, are relatively expensive.

As an overall object, therefore, the present invention seeks to provide new and improved non-contacting means for measuring a dimension of an object. In most cases, the object will be radiant or reflective; however, it will be appreciated from the following detailed description that in accordance with the invention it is necessary only for the object to have an optical appearance different than that of the background surrounding it, such as a difference in color.

Another object of the invention is to provide non-contacting means for providing an instantaneous indication of the magitude of a dimension of a moving object, which dimension may continually or intermittently vary.

A further object of the invention is to provide a non-contacting dimensional gage for objects which may be either stationary or moving.

Another object of the invention is to provide a non-contacting dimensional gage of the type described employing photocells as sensing elements.

Still another object of the invention is to provide a non-contacting dimensional gage in which optic fibers are employed to transmit light from the object being measured to light sensitive devices, such as photocells, whereby the photocells may be positioned at points removed from the object.

In accordance with the invention, there is provided a system for measuring a dimension of a moving object wherein a plurality of article sensing devices, such as photocells, are spaced along the dimension to be measured with at least some of the article sensing devices extending beyond an edge of the article. Each of the article sensing devices in the aforesaid plurality is adapted to produce an electrical signal when the article is adjacent thereto; and the outputs of the article sensing devices are connected, respectively, to a plurality of normally disabled gate circuits.

In one embodiment of the invention, the outputs of the gate circuits are applied to a counter. By sequentially enabling the gate circuits, the count of the counter after all gate circuits are enabled in sequence will be an indication of the instantaneous magnitude of the dimension being measured. Furthermore, by rapidly repeating the sequential enabling of the gate circuits and by applying the output of the counter to a visual read-out device, the read-out device will always give an instantaneous indication of the magnitude of the dimension being measured, regardless of whether the dimension is fixed, varies continually, or varies intermittently.

In another embodiment of the invention, the output of the aforesaid gate circuits are each connected to a storage unit of a shift register assembly and the gate circuits enabled simultaneously. The signals thus stored in the shift register assembly are periodically advanced through the assembly one-by-one and applied as pulses to a counter which, through a read-out device, indicates the number of pulses and, hence, the length or other dimension of the article being gaged. By repeatedly advancing the signals indicative of the dimension through the shift register assembly in rapid succession, the read-out device will again give a substantially instantaneous indication of the dimension being measured.

The above and other objects and features of the invention will become apparent from the following detailed description taken in connection with the accompanying drawings which form a part of this specification, and in which:

FIG. 2A is an end view of the mechanical portion and an accompanying schematic circuit diagram of another embodiment of the invention employing fiber-optic bundles;

FIG. 2B is a side view of the mechanical portion of the embodiment shown in FIG. 2A;

Figures 1, 3:
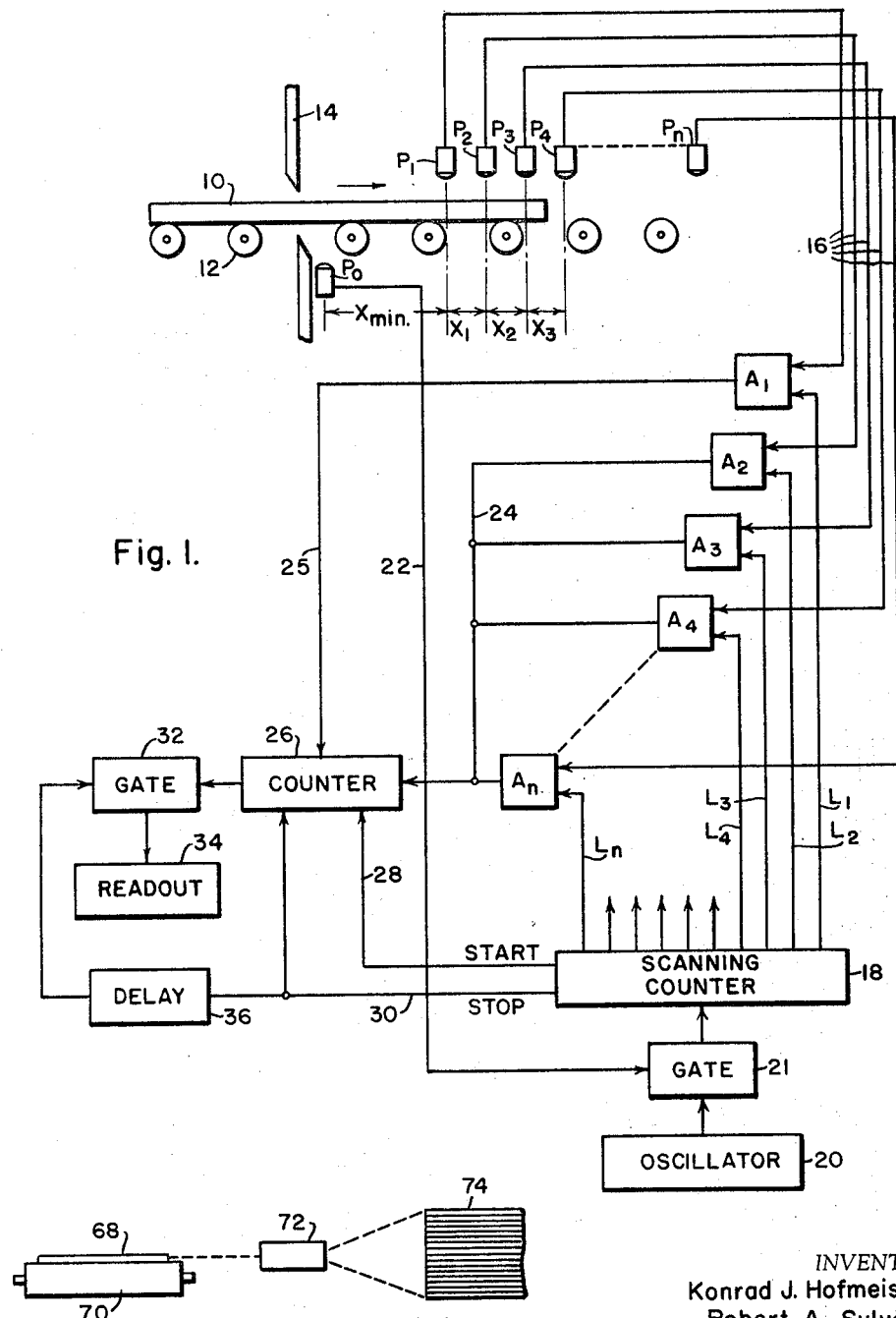
FIGURE 1 is a schematic circuit diagram of one embodiment of the invention.
FIG. 3 is a schematic illustration of the mechanical portion of still another embodiment of the invention.

Referring now to the drawings, and particularly to FIG. 1, an object 10, such as a radiant hot steel slab, moves along conveyor rolls 12 beneath a shear 14. In the usual installation, the conveyor rolls 12 will be driven by means, not shown, under the control of an operator such that the operator may move the slab 10 back and forth on the conveyor rolls 12 so as to position it at a point where the correct length of the slab to the right of the shear 14 will be cut off.

Directly beneath the shear 14 is a first potocell $P_0$ which, because of the radiant nature of the slab 10, will be actuated when the leading edge of the slab passes the shear 14. Spaced from the photocell $P_0$ in the direction of movement of the slab 10 are a series of photocells $P_1$–$P_n$ each of which will also be actuated when the leading edge of the slab 10 passes beneath it. Note that the first photocell $P_1$ is spaced from photocell $P_0$ by the distance $X_{min}$, which is the minimum length of any slab to be sheared. Each photocell $P_1$ through $P_n$ is spaced from the next preceding photocell by the distances $X_1$, $X_2$, $X_3$ and so on. Preferably, the distances $X_1$, $X_2$ and $X_3$ are equal; however they need not necessarily be so. Furthermore, as will be seen, the accuracy of the measurement will be increased as the distances between the photocells in the group $P_1$ through $P_n$ are decreased. In any case, and assuming that the distances $X_1$, $X_2$ and $X_3$ are equal, the accuracy of the device will be $X_1$ divided by the total length of the sheared slab 10.

As mentioned above, the slab 10 in the example given herein is hot and radiant, meaning that it will emit light and will serve to actuate the photocells as the leading edge of the slab passes each cell. This, however, need not necessarily be the case. Thus, it is possible to provide light sources on the side of the slab or other object opposite each photocell whereby the photocell will be actuated in the absence of light as the leading edge of the object passes between each photocell and its associated light source. Still another possibility is to provide a background as viewed by the photocells having a color different than that of the object 10 being measured. By providing the photocells with filters which eliminate all but the color of the object being measured, it will be appreciated that the photocells will be actuated in the same manner as a radiant slab when the leading edge of the object being measured passes thereby. If the object 10 is reflective, it is possible to direct light onto the same side of the object as the photocells, whereby the light reflected from the object will serve to actuate the photocells. Of course, photocells are not the only possible type of non-contacting sensors which can be used. In the case of a hot object, for example, infrared detectors are a possibility.

The output of each photocell $P_1$ through $P_n$ is applied to an associated gate circuit. The gate circuits utilized in accordance with the example given in FIG. 1 comprise AND circuits $A_1$ through $A_n$. Each AND circuit $A_1$ through $A_n$ is also connected through an associated lead $L_1$, $L_2$, $L_3$, etc. to an output terminal of a scanning counter 18. The input to the scanning counter is provided by means of a continually operating oscillator 20; however the counter 18 will not be enabled or rendered operable until a signal is received on lead 22 to enable gate 21 interposed between circuits 18 and 20. The signal on lead 22, in turn, is produced by actuation of photocell $P_0$ when the leading edge of the slab 10 passes the shear 14. Thus, the scanning counter will not be operative until the end of a slab 10 projects beyond the shear 14 preparatory to a shearing operation.

The scanning counter 18, well known to those skilled in the art, may comprise a series of cascade-connected binary flip-flop circuits having their outputs interconnected such that enabling signals are applied to the leads $L_1$–$L_n$ in sequence, whereupon the process is repeated. These enabling signals are thus applied to the AND circuits $A_1$–$A_n$ in sequence; however any one of the AND circuits will not produce an output pulse unless an enabling signal is also received on an associated lead 16 from one of the photocells $P_1$–$P_n$. In the illustration given where the edge of the slab is between the photocells $P_3$ and $P_4$, enabling signals on leads 16 will be applied to AND circuits $A_1$, $A_2$ and $A_3$ only. Consequently, as signals are applied to leads $L_1$, $L_2$ and $L_3$ in sequence, a single pulse from AND circuit $A_1$ will be applied to lead 25; and two pulses from circuits $A_2$ and $A_3$ will be applied to the same lead 24. Enabling signals on leads $L_4$–$L_n$ applied to AND circuits $A_4$–$A_n$, however, will not serve to produce output pulses on lead 24 due to the fact that enabling signals are not present on leads 16 for these AND circuits. As will be seen, the pulse on lead 25 serves to preset the counter 26 for the distance $X_{min}$; while each pulse on lead 24 serves to advance counter 26 by $X_1$, $X_2$, $X_3$, and so on.

Counter 26 is enabled through lead 28 at the beginning of each sequential scan of circuit 18 during which time the enabling signals are applied to leads $L_1$–$L_n$ in sequence. After the last enabling signal is applied to lead $L_n$, a signal on lead 30 will cut off or disable the counter 26. Thus, when a signal is received on lead 30, the count of counter 26 will be proportional to the instantaneous length of the slab 10 beyond the shear 14. This count is applied via gate 32 to a visual read-out device 34 which may be any of the well known types. The gate 32 is enabled by the signal on lead 30, after being delayed in delay circuit 36 for a very short period of time. The foregoing process is repeated for each cycle of the scanning counter 18; and since this cycle is extremely fast with respect to the speed of movement of the slab 10, the output of counter 26 as viewed on the read-out circuit 34 is an instantaneous indication of the length of the slab beyond the shear 14, and this regardless of whether the slab is moving or stationary.

Reviewing the operation of the circuit of FIG. 1, the system is completely inhibited until the slab 10 actuates the photocell $P_0$. The resulting signal on lead 22 enables gate 21 such that pulses from oscillator 20 are fed to the scanning counter 18. The scanning counter 18, through AND circuit $A_1$, samples the state of the first photocell $P_1$. If the photocell $P_1$ is actuated due to the presence of the slab 10 beneath it, an output pulse on lead 25 presets $X_{min}$ into the counter 26. The scanning counter 18 then samples photocell $P_2$. If this cell is actuated, an output pulse then advances the counter 26 by an amount equal to the distance $X_1$. Each succeeding cell $P_2$–$P_n$ is sampled in the same manner until the last cell $P_n$ is reached. After the last cell is sampled, the scanning counter 18 provides an additional pulse on lead 30 that transfers the information from counter 26 to the read-out device 34. The scanning cycle is then repeated; and since the scanning rate is very fast compared to the maximum speed of the product, updating of the length indicator will resolve the movement of the slab 10 passing no more than one pickup with a scanning cycle. Thus, as the end of the slab is moved back and forth between photocells $P_1$ and $P_n$, the read-out device 34 is continually updated to display to the shearman the actual length beyond the shear. When he obtains the desired length, he can then shear and send his remaining section of product into the vernier area between photocells $P_1$ and $P_n$ for shearing.

With reference, now, to FIGS. 2A and 2B, another embodiment of the invention is shown adapted for use in continually measuring the width, for example, of traveling hot strip which is radiant so as to emit light. The photocells and AND circuits of FIGS. 2A and 2B correspond to those used in FIG. 1 and are identified by like reference numerals. In this case, the strip, indicated by the reference numeral 40, travels along conveyor rolls 42. Beneath the strip is a lens 44 which focuses an image of reduced size onto an aligned bundle of optic fibers 46. The bundle of fibers 46 comprises a plurality of individual glass rods which are glued or otherwise securely fastened together and which will individually transmit light representing an incremental width of the strip 40 from one end of a fiber to the other. The lower ends of the fibers 46 are spaced apart as shown, and each terminates at the face of an associated photocell $P_1$ through $P_n$ which, as far as the electrical circuitry is concerned, corresponds to a photocell $P_1$ through $P_n$ shown in FIG. 1. Directly above the lens 44 is a photocell $P_0$ which likewise corresponds to the photocell $P_0$ shown in FIG. 1.

As the strip 40 moves along the conveyor rolls 42, light will be directed upon a number of the glass fibers 46, which number is proportional to the width of the strip 40. As the width of the strip varies as it moves along the conveyor rolls 42, the number of fibers having light directed thereon will also vary. Whenever light is directed upon one of the fibers 46, that light will be transmitted through the fiber to its associated photocell $P_1$ through $P_n$ to actuate the same. Thus, the number of photocells which are actuated at any time will be a function of the width of the strip 40. The outputs of the photocells are applied to AND circuits $A_1$ through $A_n$ in a manner similar to that shown in FIG. 1. In this case, however, there is no necessity for presetting into a counter a value proportional to the distance between the photocells $P_0$ and $P_1$ as was the case in FIG. 1. Rather, the outputs of all AND circuits $A_1$ through $A_n$ are applied to the input of counter 48 with each pulse from an associated AND circuit $A_1$ through $A_n$ representing an equal value.

In the operation of the system of FIG. 2A, the photocell $P_0$ will be actuated when the leading edge of the strip 40 passes over the lens 44. Consequently, the gate 50 is now enabled to apply oscillations from oscillator 52 to a scanning counter 54. The scanning counter 54, like counter 18 of FIG. 1, will not enable each of the AND circuits $A_1$ through $A_n$ in sequence, thereby producing a number of pulses on lead 56 corresponding to the number of photocells $P_1$ through $P_n$ which are actuated. This number, in turn, will be dependent upon the width of the strip 40 and will vary as the width of the strip varies upon movement over the conveyor rolls 42. Counter 48 is reset to begin counting from zero by a pulse on lead 58 at the beginning of each scanning cycle of counter 54; and at the end of each scanning cycle a signal on lead 60 stops counter 48 and, through delay circuit 62, enables the gate circuit 64 to pass the information from counter 48 to a read-out device 66. This process, of course, is repeated during each scanning cycle of counter 54 with the result that a continuous up-to-date indication of the width of the strip 10 is continually displayed on the read-out device 66.

In the system of FIGS. 2A and 2B, the arrangement of the fibers in the bundle 46 need not be coherent. That is, the fiber directed onto photocell $P_1$, for example, need not necessarily be the first fiber in the bundle, but could conceivably be the third or fourth. This is the case since the system counts pulses and is not concerned with the locations of the specific photocells which detect those pulses. The resolution of the system is dependent upon the number of optic fibers placed in a row, and the location of the bundle can be above or below the slab 40, depending upon requirements. One of the primary advantages of the system of FIGS. 2A and 2B is that it eliminates the necessity for positioning any type of transducer in close proximity to a hot strip or other object being measured. The optic fibers 46 themselves can withstand temperatures up to about 700° F., and the photocells $P_1$ through $P_n$, which can withstand maximum temperatures of a much lower magnitude, can be positioned at a considerable distance from the hot strip.

In FIG. 3, a system is shown, similar to that shown in FIGS. 2A and 2B, but wherein the width of very narrow strip 68 traveling on conveyor rolls 70 is continually monitored. In this case, an image of the edge of the strip 68 is magnified in a lens system 72 rather than reduced in size as in the embodiment shown in FIGS. 2A and 2B. After magnification, it is focused onto an optic fiber bundle 74 which, together with photocells, not shown, functions in the same manner as the system of FIGS. 2A and 2B. A system such as that shown in FIG. 3, for example, can be used to control the screwdown on a rolling mill for the purpose of gage control.

Figure 4:
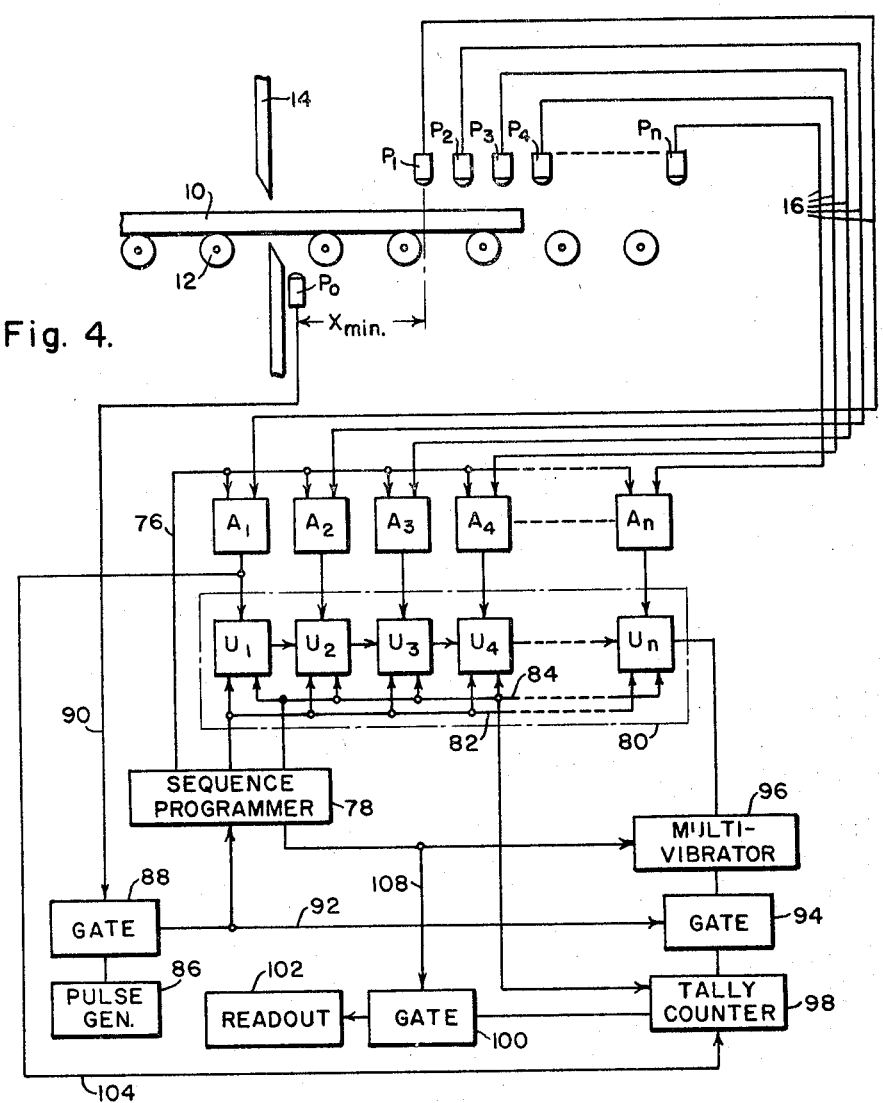
FIG. 4 is a schematic circuit diagram of another embodiment of the invention employing a shift register assembly.

In FIG. 4, still another embodiment of the invention is shown wherein elements corresponding to those shown in FIG. 1 are again identified by like reference numerals. Thus, the irradiant hot steel slab 10 moves along conveyor rolls 12 beneath a shear 14. Directly beneath the shear 14 is a first photocell $P_0$ actuated when the leading edge of the slab passes shear 14. Spaced from the photocell $P_0$ by the distance $X_{min}$ in the direction of movement of the slab 10 are a series of equally spaced photocells $P_1-P_n$ each of which is actuated when the leading edge of the slab 10 passes beneath it.

As in the embodiment of FIG. 1, the output of each of the photocells $P_1-P_n$ is connected through a lead 16 to an associated AND circuit $A_1$ through $A_n$; however here the similarity ends. Instead of enabling the AND circuits $A_1$ and $A_n$ in sequence as in the embodiment of FIG. 1, all AND circuits $A_1-A_n$ in FIG. 4 are enabled simultaneously by a signal on lead 76 derived from a sequence programmer 78. The output of each AND circuit $A_1-A_n$ is applied to an associated storage unit $U_1-U_n$ of a shift register assembly 80. Shift pulses are applied to the units $U_1-U_n$ of a shift register assembly 80 from sequence programmer 78 through lead 82; while a reset pulse is applied to the units $U_1-U_n$ from sequence programmer 78 through lead 84 at the completion of a measuring operation.

The sequence programmer 78 is actuated by means of a pulse generator 86 connected to circuit 78 through gate circuit 88, this latter circuit 88 being enabled when the leading edge of the slab 10 passes over the photocell $P_0$. That is, when the leading edge of the slab 10 passes over photocell $P_0$, a signal is applied via lead 90 to gate circuit 88, thereby enabling the gate circuit and permitting pulses from generator 86 to be applied to the sequence programmer 78. At the same time, when gate circuit 88 is enabled upon passage of the leading edge of slab 10 over photocell $P_0$, the pulses passing through gate 88 are applied via lead 92 to a second gate circuit 94.

Connected to the output of the last unit $U_n$ of shift register assembly 80 is a monostable multivibrator 96 which is switched from one stable state to the other when the first sequential pulse is applied thereto from the assembly 80. When the multivibrator 96 is thus switched from one stable state to the other upon arrival of the first pulse from assembly 80, it remains in its other stable state and enables gate 94 until all possible pulses indicative of an actuated photocell in the series $P_1-P_n$ have been shifted to the output of assembly 80. During this time, a number of pulses corresponding to the number of actuated photocells pass through gate circuits 88 and 94 from generator 86. These pulses are applied to a tally counter 98, the output of which is adapted to be applied through gate circuit 100 to a read-out device 102. The minimum distance between the photocells $P_0$ and $P_1$, $X_{min}$, is preset into the tally counter 98 when the first photocell $P_1$ is actuated and AND circuit $A_1$ enabled. That is, when circuit $A_1$ is enabled, a signal passes through lead 104 to the tally counter 98 to preset into it $X_{min}$. The tally counted 98 is reset by the signal on lead 84, which signal is produced by the sequence programmer 78 to also reset all of the units $U_1$–$U_n$ in the shift register assembly 80 as was mentioned above. Finally, the gate circuit 100 is enabled after the information stored in the shift register assembly 80 is transferred through gate circuit 94 to tally counter 98, but before assembly 80 and counter 98 are reset. The gate 100 is enabled by a signal on lead 108 derived from the sequence programmer 78 in a manner hereinafter described.

The operation of the embodiment of FIG. 4 is as follows: When the leading edge of the slab 10 passes over the photocell $P_0$, a signal on lead 90 will engage gate 88, whereupon pulses from pulse generator 86 will be applied to the sequence programmer 78. The sequence programmer 78 is a device for producing signals on leads 76, 82, 84 and 108 in predetermined time sequence after receiving the initial pulse from generator 86. When pulses pass through gate circuit 88 to the sequence programmer 78, the first pulse produces a signal on lead 76 to enable the AND circuits $A_1$–$A_n$. Thereafter, as the leading edge of the slab travels beneath successive ones of the photocells $P_1$–$P_n$, signals will be applied through the enabled AND circuits $A_1$–$A_n$ to units $U_1$–$U_n$ in the shift register assembly 80 corresponding to the number of actuated photocells. This number, in turn, is indicative of the length of the slab 10 projecting beyond the shear 14, as will be understood. When $n$ pulses pass through the sequence programmer 78 to lead 82, the signals stored in the units $U_1$–$U_n$ will be advanced successively as pulses to the monostable multivibrator 96. As will be understood, the length of the slab 10 beyond shear 14 is determined by the last photocell which is actuated in the series $P_1$–$P_n$. In the illustration given in FIG. 4, this last photocell comprises cell $P_3$. As $n$ pulses are applied to lead 82 to advance the stored information in assembly 80 to the monostable multivibrator 96, the multivibrator will not switch stable states and gate 94 will remain disabled until $n$ minus 3 pulses have been applied to lead 82. At this point, multivibrator 96 will switch stable states; and gate 94 will be enabled to pass pulses on lead 92 to the tally counter 98, these pulses occurring in synchronism with the shift pulses on lead 82. The result, of course, is that three pulses indicative of the length of slab 10 beyond shear 14 are passed through gate 94 to counter 98 as $n$ pulses are applied to lead 82.

When $n+1$ pulses are applied to the sequence programmer 78, two things happen. First, a pulse on lead 108 switches multivibrator 96 back to its original or first state, thereby disabling gate circuit 94 and preventing the infeed of further pulses to counter 98. Second, this same pulse on lead 108 enables gate 100 to pass the count of tally counter 98 to the read-out device 102.

Finally, when $n+2$ pulses are delivered to sequence programmer 78 from pulse generator 86, a pulse is produced on lead 84 to reset units $U_1$ through $U_n$ and tally counter 98, whereupon the cycle is repeated. Thus, a length measuring operation occurs each time $n+2$ pulses are produced by pulse generator 86, assuming gate 88 is enabled. This cycle occurs with extreme rapidity with respect to the speed of movement of slab 10. Consequently, an instantaneous indication of length appears at read-out 102, and this indication varies as the slab moves back and fourth on rolls 12.

The multivibrator 96, of course, could be eliminated and the output pulses from assembly 80 applied directly to gate 94. By using the multivibrator, however, the accuracy of the length measurement is dependent only upon the last photocell adjacent the leading edge of slab 10 being actuated. Let us assume, for example, that the leading edge of the slab 10 is just beyond the tenth photocell $P_{10}$ in the series $P_1$–$P_n$ and that for some reason or other, the fifth photocell $P_5$ is disabled. The operator will ordinarily be unaware of the fact that $P_5$ is not operating, particularly if the malfunction has just occurred.

With the arrangement shown, however, malfunctioning of one or more of the photocells behind the leading cell has no effect on accuracy since multivibrator 96 is switched from one stable state to the other only by the first pulse from $P_{10}$, the pulses applied to counter 98 being those from generator 86 and not dependent upon proper functioning of all photocells in the series $P_1$–$P_n$.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a system for measuring a dimension of an object, the combination of a plurality of article sensing devices spaced along said dimension with at least some of said article sensing devices extending beyond an edge of said article when said dimension is measured, each of said article sensing devices in said plurality being adapted to produce an electrical signal when the article is adjacent thereto, a plurality of gate circuits each connected to the output of an associated one of the article sensing devices in said plurality of devices, a counter, and means for applying the outputs of said gate circuits to said counter in sequence whereby the count of said counter after the outputs of all gate circuits are applied thereto in sequence will be an indication of the dimension being measured.

2. In a system for measuring a dimension of an object having an optical appearance different than the background surrounding it, the combination of a plurality of photoelectric devices spaced along the dimension to be measured such that the plurality of photoelectric devices will extend beyond at least one edge of said object when said dimension is measured and the number of photoelectric devices actuated by the object will be dependent upon the dimension being measured, a plurality of normally disabled gate circuits each connected to the output of an associated one of the photoelectric devices in said plurality of devices, a counter connected to the outputs of all said gate circuits, and means for enabling said gate circuits in sequence whereby the count of said counter after all gate circuits are enabled in sequence will be an indication of the magnitude of said dimension.

3. In a system wherein an object having an optical appearance different than the background surrounding it moves along a path of travel, the combination of means for continually measuring the instantaneous length of the object which projects beyond a fixed point along its path of travel, comprising a plurality of photoelectric devices spaced along said path of travel beyond said fixed point, each of the photoelectric devices in said plurality being actuable when said object is adjacent thereto, a plurality of normally disabled gate circuits each connected to the output of an associated one of the photoelectric devices in said plurality of devices, a counter connected to the outputs of all of said gate circuits, and means for enabling said gate circuits sequentially whereby the count of said counter after all gate circuits are enabled in sequence will be an indication of the length of the object beyond said fixed point.

4. In a system wherein an object having an optical appearance different than the background surrounding it moves along a path of travel, the combination of means for continually measuring the instantaneous length of the object which projects beyond a fixed point along its path of travel, comprising a first photoelectric device at said fixed point and actuable by the presence of the object at said point, a plurality of photoelectric devices spaced along said path of travel beyond said fixed point, each of the photoelectric devices in said plurality being actuable when said object is adjacent thereto, a plurality of normally disabled gate circuits each connected to the output of an associated one of the photoelectric devices in said plurality of devices, a counter connected to the outputs of all of said gate circuits, and means operable upon actuation of said first photoelectric device for enabling said gate circuits sequentially whereby the count of said counter after all gate circuits are enabled in sequence will be an indication of the length of the object beyond said fixed point.

5. In a system wherein an object having an optical appearance different than the background surrounding it moves along a path of travel, the combination of means for continually measuring the instantaneous length of the object which projects beyond a fixed point along its path of travel, comprising a first photoelectric device at said fixed point and actuable by the presence of the object at said point, a plurality of photoelectric devices spaced along said path of travel beyond said fixed point, each of the photoelectric devices in said plurality being actuable when said object is adjacent thereto, a plurality of normally disabled gate circuits each connected to the output of an associated one of the photoelectric devices in said plurality of devices, a counter connected to the outputs of all of said gate circuits, scanning means operable upon actuation of said first photoelectric device for enabling said gate circuits sequentially whereby the count of said counter after all gate circuits are enabled in sequence will be an indication of the length of the object beyond said fixed point, and means for resetting said counter each time all of said gate circuits are enabled in sequence, the count of said counter immediately before it is reset being the instantaneous length of said object beyond said fixed point regardless of its position along said path of travel.

6. The combination of claim 5 wherein a visual read-out device is connected to the output of said counter, and wherein the count of said counter is transferred to the read-out device each time the counter is reset, but before the counter is reset.

7. In a system wherein an object having an optical appearance different than the background surrounding it moves along a path of travel, the combination of means for continually measuring the instantaneous length of the object which projects beyond a fixed point along its path of travel, comprising a plurality of photoelectric devices spaced along said path of travel beyond said fixed point, each of the photoelectric devices in said plurality being actuable when said object is adjacent thereto, a plurality of normally disabled gate circuits each connected to the output of an associated one of the photoelectric devices in said plurality of devices, a counter connected to the outputs of all of said gate circuits, means for enabling said gate circuits sequentially whereby the count of said counter after all gate circuits are enabled in sequence will be an indication of the length of the object beyond said fixed point, and means for resetting said counter each time the gate circuits are all enabled in sequence.

8. In a system wherein an object moves along a path of travel, the combination of means for continually measuring the instantaneous length of the object which projects beyond a fixed point along its path of travel, comprising a first article sensing device at said fixed point and actuable by the presence of the object at said point, a plurality of article sensing devices spaced along said path of travel beyond said fixed point, each of the article sensing devices in said plurality being actuable when said object is adjacent thereto, a plurality of normally disabled gate circuits each connected to the output of an associated one of the article sensing devices in said plurality of devices, a counter connected to the outputs of all of said gate circuits, and means operable upon actuation of said first article sensing device for enabling said gate circuits sequentially whereby the count of said counter after all gate circuits are enabled in sequence will be an indication of the length of the object beyond said fixed point.

9. In a system wherein an object moves along a path of travel, the combination of means for continually measuring the instantaneous length of the object which projects beyond a fixed point along its path of travel, comprising a first article sensing device at said fixed point and actuable by the presence of the object at said point, a plurality of article sensing devices spaced along said path of travel beyond said fixed point, the spacing of the first said plurality of article sensing devices from said fixed point being equal to the minimum length to be measured and the spacing between successive article sensing devices in said plurality being equal to the minimum increment of the length to be measured, each of the article sensing devices in said plurality being actuable when said object is adjacent thereto, a plurality of normal disabled gate circuits each connected to the output of an associated one of the article sensing devices in said plurality of devices, a single normally disabled gate circuit connected to the ouput of said first article sensing device, a counter connected to the outputs of all said gate circuits such that a signal from said single gate circuit will preset into the counter the minimum length to be measured while a signal from any one of said plurality of gate circuits will advance the counter in an amount equal to said minimum increment of length, and means operable upon actuation of said first article sensing device for enabling said single gate circuit and said plurality of gate circuits sequentially whereby the count of said counter after all gate circuits are enabled in sequence will be an indication of the length of the object beyond said fixed point.

10. In a system for measuring the edge-to-edge dimension of an object having an optical appearance different than the background surrounding it, the combination of a plurality of optic fibers spaced along the dimension to be measured and having ends facing said object whereby light from the object will be transmitted through the optic fibers, at least some of said fibers having ends beyond the edges of said dimension when the dimension is measured and unresponsive to light from the object, a plurality of photocells each of which is at the end opposite said first mentioned end of an associated one of said optic fibers and responsive to light transmitted through that fiber from the object, a plurality of normally disabled gate circuits each connected to the output of an associated one of the photocells in said plurality of photocells, a counter connected to the outputs of all of said gate circuits, and means for enabling said gate circuits in sequence whereby the count of said counter after all gate circuits are enabled in sequence will be an indication of the magnitude of said dimension.

11. The system of claim 10 wherein a visual read-out device is connected to the output of said counter, and wherein the count of said counter is transferred to the read-out device each time all gate circuits are enabled in sequence.

12. The system of claim 10 wherein lens means is provided for focusing an image of reduced size onto said first-mentioned ends of the optic fibers.

13. The system of claim 10 and including lens means for focusing an image of the dimension being measured onto said first-mentioned ends of the optic fibers, the image being magnified.

14. In a system for measuring a dimension of an object, the combination of a plurality of article sensing devices spaced along said dimension with at least some of said article sensing devices extending beyond an edge of said article when the dimension is measured, each of said article sensing devices in said plurality being adapted to produce an electrical signal when the article is adjacent thereto, a plurality of normally disabled gate circuits each connected to the output of an associated one of the article sensing devices in said plurality of devices, a counter connected to the outputs of all said gate circuits, and means for enabling said gate circuits sequentially whereby the count of said counter after all gate circuits are enabled in sequence will be an indication of the dimension being measured.

15. In a system for continually measuring the instantaneous length of an object which projects beyond a fixed point along a path of travel, a first article sensing device at said fixed point and actuable by the presence of the object at said point, a plurality of article sensing devices spaced along said path of travel beyond said fixed point, each of the article sensing devices in said plurality being actuable when said object is adjacent thereto, a plurality of gate circuits each connected to the output of an associated one of the article sensing devices in said plurality of devices, a shift register assembly having a plurality of serially-connected storage units therein, each of said storage units being connected to the output of an associated one of said gate circuits, means for enabling all of said gate circuits simultaneously when said first article sensing device is actuated, a counter connected to the output of the serially-connected storage units of said shift register assembly, and means actuable after said gate circuits are enabled for advancing a number of signals equal to the number of signals stored in said storage units to said counter whereby the count of said counter will be an indication of the length of said article beyond said fixed point.

References Cited
UNITED STATES PATENTS

| | | | |
|---|---|---|---|
| 3,066,226 | 11/1962 | Lindstrom | 250—219 |
| 3,150,356 | 9/1964 | Newman | 250—227 |

RALPH G. NILSON, *Primary Examiner.*

MARTIN ABRAMSON, *Assistant Examiner.*

U.S. Cl. X.R.

250—222, 227